(12) United States Patent
Park

(10) Patent No.: US 12,098,787 B2
(45) Date of Patent: Sep. 24, 2024

(54) PIPE BINDING BAND AND PIPE BINDING MECHANISM COMPRISING SAME

(71) Applicant: Myeong Su Park, Seoul (KR)

(72) Inventor: Myeong Su Park, Seoul (KR)

(*) Notice: Subject to any disclaimer, the term of this patent is extended or adjusted under 35 U.S.C. 154(b) by 0 days.

(21) Appl. No.: 18/293,562

(22) PCT Filed: Mar. 13, 2023

(86) PCT No.: PCT/KR2023/003346
§ 371 (c)(1),
(2) Date: Jan. 30, 2024

(87) PCT Pub. No.: WO2023/219247
PCT Pub. Date: Nov. 16, 2023

(65) Prior Publication Data
US 2024/0263726 A1    Aug. 8, 2024

(30) Foreign Application Priority Data
May 10, 2022   (KR) .................. 10-2022-0056978

(51) Int. Cl.
*F16L 21/06*   (2006.01)
*F16L 47/32*   (2006.01)

(52) U.S. Cl.
CPC .............. *F16L 21/06* (2013.01); *F16L 47/32* (2013.01)

(58) Field of Classification Search
CPC ......... F16L 17/02; F16L 21/00; F16L 21/002; F16L 21/005; F16L 33/02; F16L 33/08; F16L 33/085; F16L 47/00; F16L 47/06; F16L 47/12; F16L 55/16; F16L 55/168; F16L 55/17; F16L 55/1705
See application file for complete search history.

(56) References Cited

U.S. PATENT DOCUMENTS 8,783,730 B2 *   7/2014   Pires Cabado ......... F16L 21/08
                                                         285/321
2002/0171244 A1   11/2002   Wachter et al.

FOREIGN PATENT DOCUMENTS

| JP | 4768508 B2 | 9/2011 |
|----|-----------|--------|
| KR | 10-0586688 B1 | 6/2006 |
| KR | 20-0422113 Y1 | 7/2006 |
| KR | 10-2010-0034172 A | 4/2010 |

* cited by examiner

*Primary Examiner* — Aaron M Dunwoody
(74) *Attorney, Agent, or Firm* — Bridgeway IP Law Group, PLLC; Jihun Kim

(57) ABSTRACT

A pipe binding band comprises: a band body which is formed in a ring shape so as to surround interconnection end portions of a first and a second pipe in the circumferential direction and has a structure capable of adjusting a close contact coupling force to the external surfaces of the first and the second pipe through an adjustment member; and a plurality of pressing pins which are arranged to be spaced apart from each other along the longitudinal direction of the band body and provide a pressing force to the first and the second pipe so that the first and the second pipe move in a direction closer to each other as the close contact coupling force increases.

1 Claim, 7 Drawing Sheets

(a)

(b)

PIPE BINDING BAND AND PIPE BINDING MECHANISM COMPRISING SAME

TECHNICAL FIELD

The present invention relates to pipe binding bands and a pipe binding device having the same that are capable of easily connecting a pair of pipes to each other and facilitating rapid repair or exchange work for the pipes if necessary.

BACKGROUND ART

Generally, a sewage or waste water pipe made of a synthetic resin is built by continuously connecting unit pipes having a given length. When the pipes are initially installed or repaired due to partial breakage thereof, their end portions are connected to each other, without having any water leakage therefrom.

According to one of conventional methods for connecting end portions of pipes, a rubber pipe for preventing water leakage is fitted to the outer peripheries of the end portions of two pipes to be connected to each other, and semi-cylindrical or cylindrical clamps are tightenedly fastened to the outer peripheral surface of the rubber pipe, so that the end portions of the pipes are connected to each other, without any water leakage.

According to the above-mentioned conventional method, the rubber pipe, which is fitted to the outer peripheries of the two pipes to be connected to each other, is fixed to the two pipes by means of the fastening of the clamps, and therefore, water leakage through the rubber pipe is just expected.

The conventional pipe binding device is configured to allow the rubber pipe to pressurize the outer peripheral surfaces of the pipes so that the pipes come into close contact with each other and are thus connected to each other, but in this case, direct connection of the pipe binding device to the pipes is not suggested at all.

If the pipes are clogged, further, they are unclogged by flowing high-pressure water from one side pipe to the other side pipe. However, because the conventional pipe binding device is not connected directly to the pipes, as mentioned above, the pipe, which is located at the rear side with respect to the flowing direction of the high-pressure water, when high-pressure unclogging is performed through the flow of high-pressure water, is pushed and separated (from the connected portion thereof), so that water leakage occurs through the connected portion of the pipe.

DISCLOSURE OF THE INVENTION

Technical Problems

Accordingly, the present disclosure has been made in view of the above-mentioned problems occurring in the related art, and it is an object of the present invention to provide pipe binding bands and a pipe binding device having the same that are capable of being fixed integrally to a pair of pipes when the pair of pipes are connected to each other, so that when an external force is applied to the pipes or the pipes are clogged to thus perform high-pressure unclogging, the pipes are prevented from being pushed and separated from the pipe binding bands by the flow pressure of high-pressure water, and further, water leakage is prevented.

It is another object of the present invention to provide pipe binding bands and a pipe binding device having the same that are capable of applying pressurizing forces to a pair of pipes in such a way as to move the pipes in directions closer to each other, in a process of being tightly coupled to the pipes, so that water leakage is more reliably prevented through the close contact with the pipes.

Technical Solutions

To accomplish the above-mentioned objects, according to one aspect of the present invention, there are provided a pipe binding band for connecting a first pipe and a second pipe made of a synthetic resin to each other, the pipe binding band including: a band body formed in a ring shape to surround interconnected end portions of the first pipe and the second pipe in circumferential directions thereof, and adapted to adjust close contact coupling forces to the outer peripheral surfaces of the first pipe and the second pipe through adjustment members mounted thereon; and a plurality of pressurizing pins spaced apart from one another along longitudinal directions of the band body, providing pressurizing forces to the first pipe and the second pipe so that the first pipe and the second pipe move in directions closer to each other, wherein the plurality of pressurizing pins are arranged on one side transverse periphery of the band body so that, as the close contact coupling forces of the band body with the first pipe and the second pipe increase, portions of ends of the plurality of pressurizing pins are inserted into the first pipe and the second pipe to allow the pressurizing forces to be applied to the first pipe and the second pipe.

The plurality of pressurizing pins may be slantingly bent from the transverse end portion of the band body, forming an angle less than 90° with the band body.

To accomplish the above-mentioned objects, according to another aspect of the present invention, there is provided a pipe binding device for connecting a first pipe and a second pipe made of a synthetic resin to each other, the pipe binding device including: a tightening plate made from a metal material having given elasticity and surrounding interconnected end portions of the first pipe and the second pipe in a circumferential direction thereof, in such a way as to allow both side end portions thereof to be stacked on top of each other; and at least two or more pipe binding bands fixed integrally to the tightening plate in such a way as to be spaced apart from each other The tightening plate and the pipe binding bands may be integrally coupled to each other by welding.

Advantageous Effects of the Invention

According to the pipe binding bands and the pipe binding device having the same, each pipe binding band has the plurality of pressurizing pins formed on the band body thereof, and when the pair of pipes is connected to each other using the pipe binding bands, the pipe binding bands are fixed integrally to the pipes, so that when an external force is applied to the pipes or high-pressure unclogging is performed for the pipes clogged, the pipes are prevented from being pushed and separated from the pipe binding bands by the flow pressure of high-pressure water.

In a process where the pipe binding device is tightly coupled to the connected portions of the pipes, further, the plurality of pressurizing pins provide pressurizing forces to the pipes in such a way as to move the pipes in the directions closer to each other, so that water leakage is more reliably prevented through the close contact with the pipes.

According to the present invention, further, the pipes are not connected to each other by means of bonding, and if it is necessary to repair/exchange the pipes, accordingly, the repair and exchange works are more easily and quickly done than those in the conventional technologies. Even when both side pipes are connected to each other, further, the connection work is rapidly done because the bonding work is not performed.

BEST MODE FOR INVENTION

Figure 1:
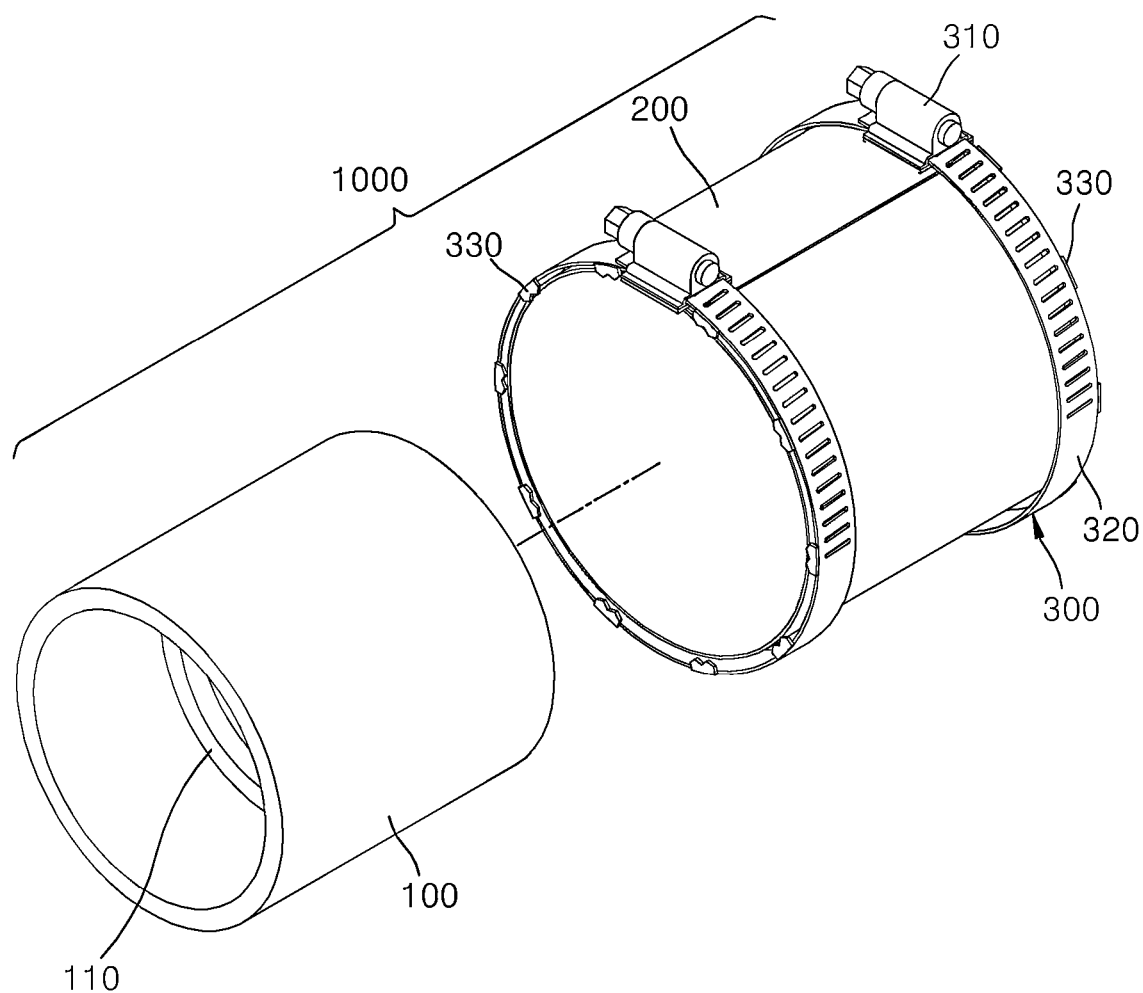
FIG. 1 is a perspective view showing a pipe binding device according to an embodiment of the present invention.

Hereinafter, an embodiment of the present invention will be described in detail below with reference to the accompanying drawings. However, the present invention may be modified in various ways, without being limited to the embodiment as will be described below, and the embodiment of the present invention allows the disclosure to be perfect and makes the scope of the present invention completely recognized by one of ordinary skill in the art. Through the accompanying drawings, the same reference numerals will be used to describe the same components.

Pipe binding bands and a pipe binding device having the same according to an embodiment of the present invention are capable of being fixed integrally to a pair of pipes when the pair of pipes is connected to each other, so that when an external force is applied to the pipes or the pipes are clogged to thus perform high-pressure unclogging, the pipes are prevented from being pushed and separated from the pipe binding bands by the flow pressure of high-pressure water.

Further, the pipe binding bands and the pipe binding device having the same according to the embodiment of the present invention are capable of applying pressurizing forces to a pair of pipes in such a way as to move the pipes in directions closer to each other in a process of being tightly coupled to the pipes, so that water leakage is more reliably prevented through the close contact with the pipes.

According to the present invention, further, the pipes are not connected to each other by means of bonding, and if it is necessary to repair/exchange the pipes, accordingly, the repair and exchange works are more easily and quickly done than those in the conventional technologies. Even when both side pipes are connected to each other, further, the connection work is rapidly done because the bonding work is not performed.

Hereinafter, an embodiment of the present invention will be explained in detail.

Figure 2:
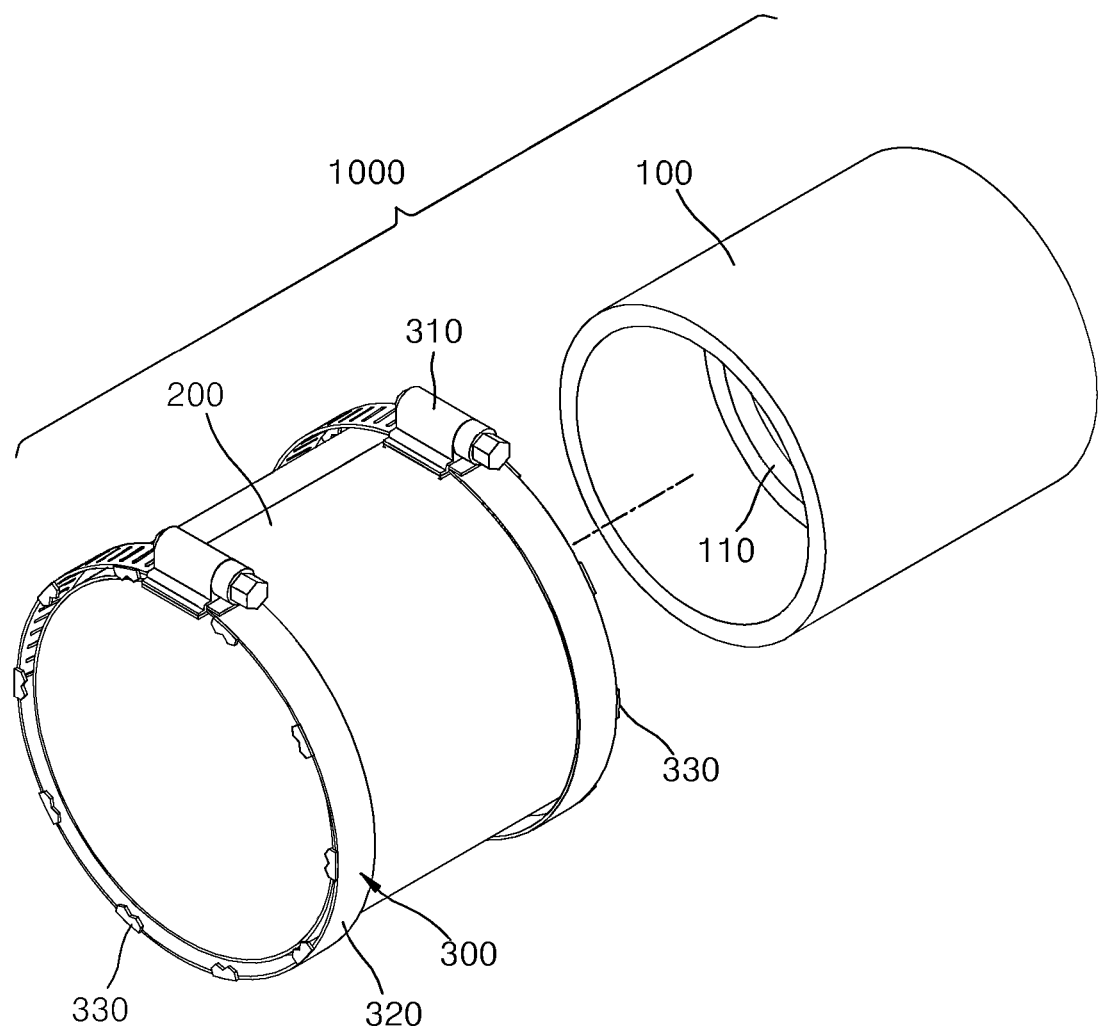
FIG. 2 is a perspective view showing the rear side of FIG. 1.
Figure 3:
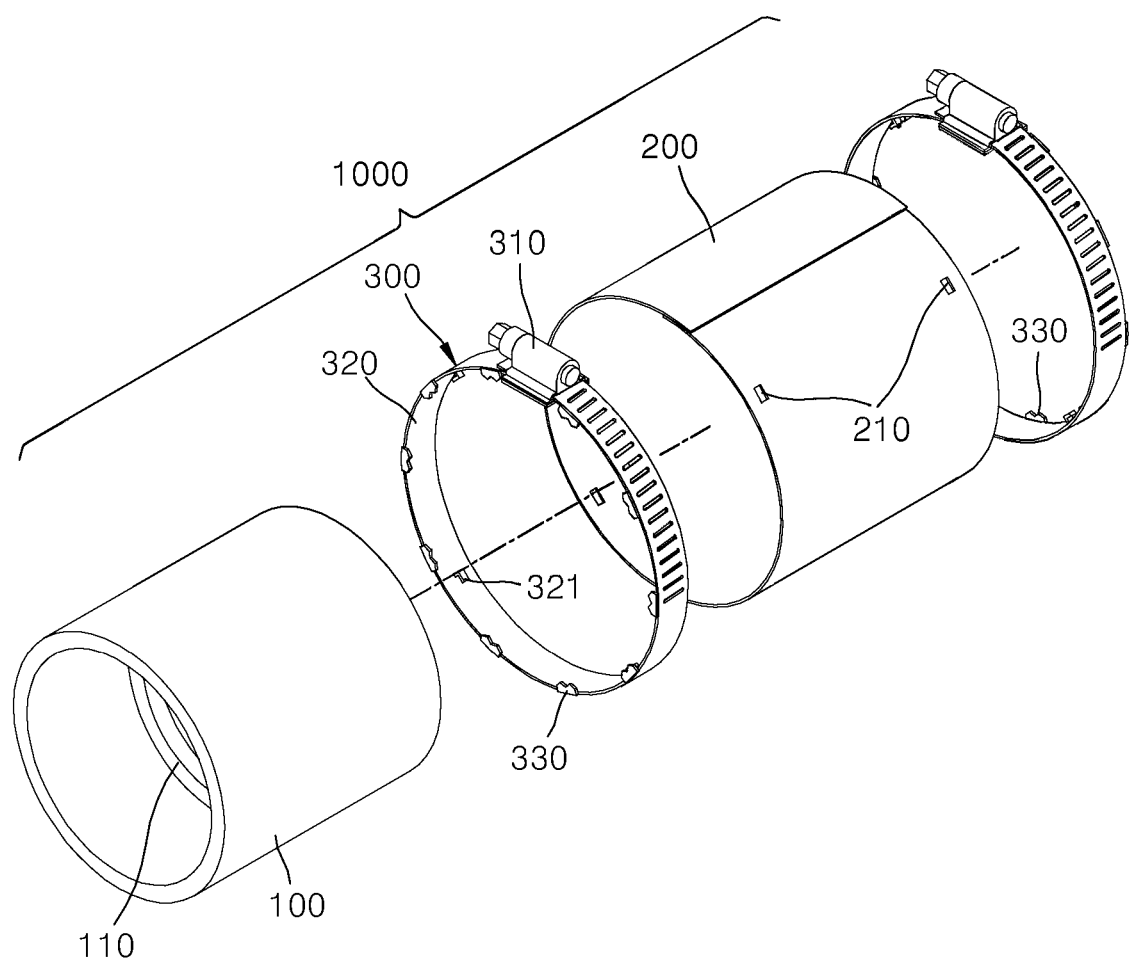
FIG. 3 is an exploded perspective view showing the pipe binding device according to the embodiment of the present invention.

As shown in FIGS. 1 to 3, a pipe binding device 1000 according to the embodiment of the present invention serves to connect a first pipe 10 and a second pipe 20 made of a synthetic resin to each other and includes a rubber band 100, a tightening plate 200, and pipe binding bands 300.

In this case, the first pipe 10 and the second pipe 20 are made of a synthetic resin having given ductility, such as PVC, and the like.

Figure 4:
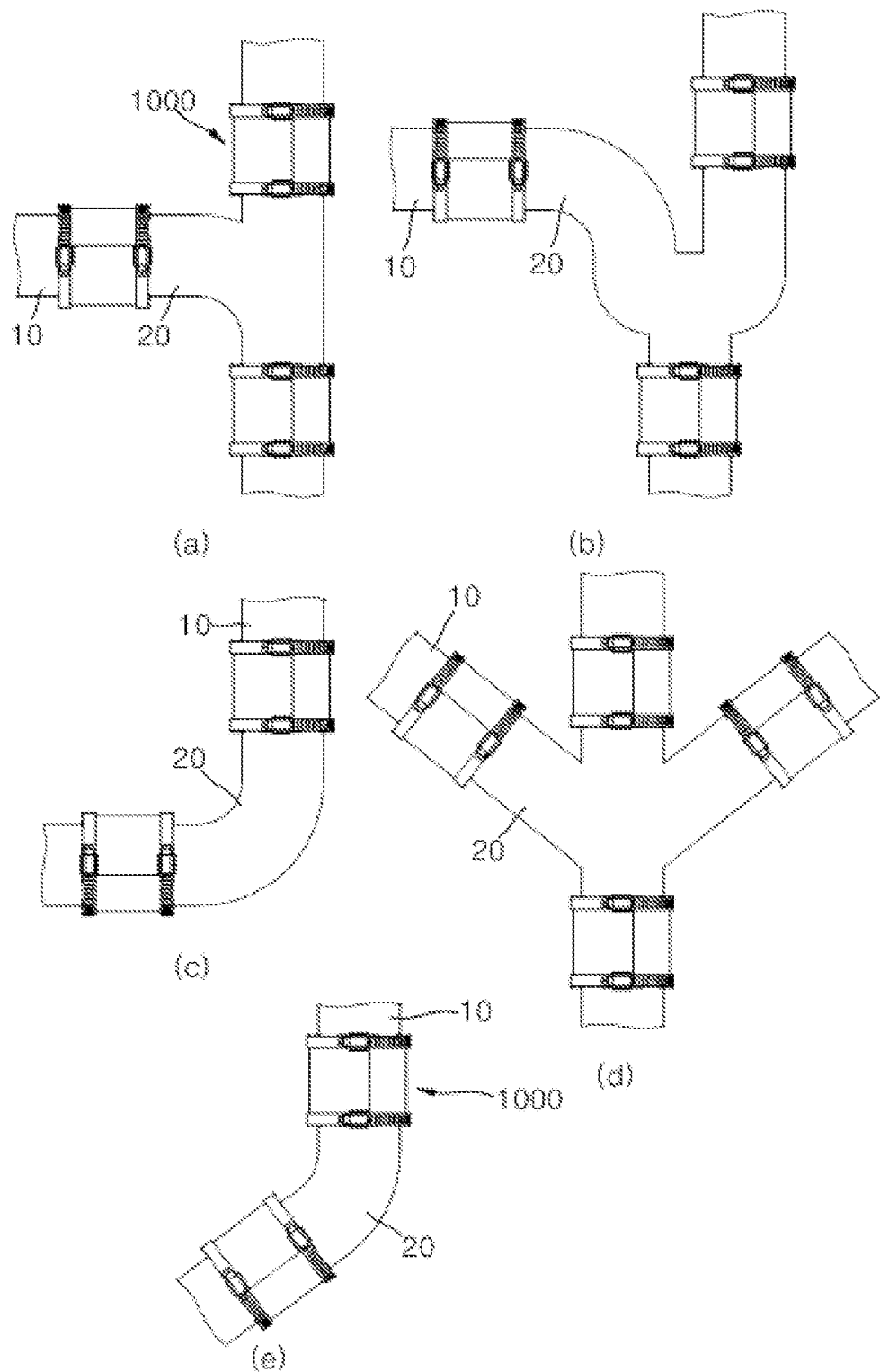
FIG. 4 is a side view showing states where the pipe binding device according to the embodiment of the present invention is mounted onto a variety of connected portions of pipes.

As shown in FIG. 4, the pipe binding device 1000 according to the embodiment of the present invention may be located on a variety of connected portions where a plurality of pipes are connected, and for the conveniences of description and illustration, the first pipe 10 and the second pipe 20, which are in linear forms, are connected to each other.

The rubber band 100 has the shape of a ring and is made of rubber having given ductility to provide a close contact force with the outer peripheral surfaces of the pipes. The rubber band 100 has a contact ring 110 located on the inner peripheral surface thereof to allow the end portions of the first pipe 10 and the second pipe 20 to be brought into contact therewith.

The end portion of the first pipe 10 is inserted into one side opening of the rubber band 100 by a worker, and next, the end portion of the second pipe 20 is inserted into the other side opening of the rubber band 100 by him or her. Accordingly, the rubber band 100 primarily connects the first pipe 10 and the second pipe 20 to each other.

As the rubber band 100 comes into close contact with the outer peripheral surfaces of the first pipe 10 and the second pipe 20 having the given ductility, it prevents water from leaking through a connected gap between the first pipe 10 and the second pipe 20 to some extent.

The tightening plate 200 is fitted to the outer peripheral surface of the rubber band 100 and made of a metal having given elasticity. Further, the tightening plate 200 surrounds the interconnected end portions of the first pipe 10 and the second pipe 20 in a circumferential direction thereof in such a way as to allow both side end portions thereof to be stacked on top of each other.

The tightening plate 200 is coupled to the pipe binding bands 300, and to primarily couple the tightening plate 200 and the pipe binding bands 300 to each other before they are welded to each other, as shown in FIG. 3, a plurality of locking holes 210 are formed on the tightening plate 200. A detailed explanation will be given later.

The tightening plate 200 is mounted to entirely surround the outer peripheral surface of the rubber band 100 in the circumferential direction thereof, and if coupling forces of adjustment members 310 as will be discussed later are adjusted by the worker, the end portions of the tightening plate 200 stacked on top of each other are tightened to pressurize the rubber band 100 so that the rubber band 100 comes into close contact with the outer peripheral surfaces of the first pipe 10 and the second pipe 20. As the rubber band 100 is brought into close contact with the outer peripheral surfaces of the pipes, water leakage is prevented.

Figure 5:
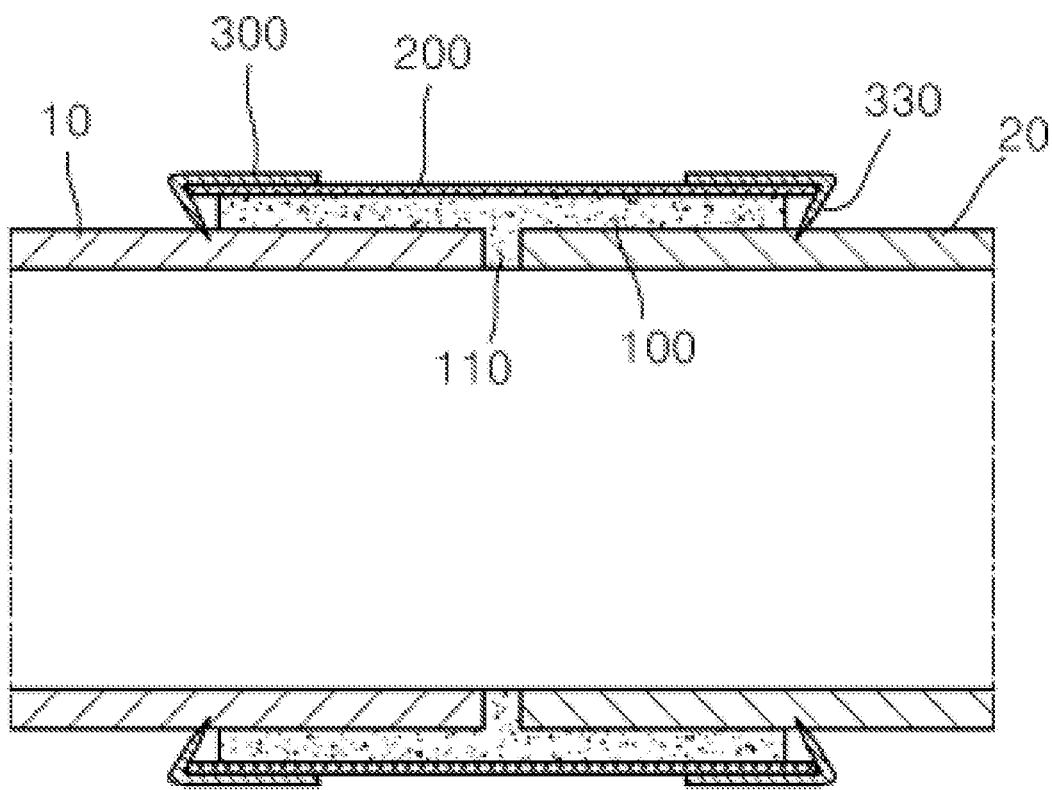
FIG. 5 is a sectional view showing a state where the pipe binding device according to the embodiment of the present invention is mounted onto connected portions of pipes.

According to the embodiment of the present invention, as shown in FIG. 5, a width of the tightening plate 200 is desirably bigger than a width of the rubber band 100 to allow pressurizing pins 330 as will be discussed later to be inserted into the outer peripheral surfaces of the first pipe 10 and the second pipe 20 to given depths.

While the adjustment members 310 are being controlled to allow the pipe binding bands 300 to be tightened, accordingly, the pressurizing pins 330 are easily inserted into the first pipe 10 and the second pipe 20, without being inserted into the rubber band 100.

As shown, next, at least two or more pipe binding bands 300 are fixed integrally to the tightening plate 200 in such a way as to be spaced apart from each other in a transverse direction of the tightening plate 200. In the drawings, two pipe binding bands 300 are provided, but four pipe binding bands, six pipe bind bands, or six or more pipe binding bands may be provided.

According to the embodiment of the present invention, each pipe binding band 300 includes a band body 320 and the plurality of pressurizing pins 330.

The band bodies 320 are formed in a ring shape in such a way as to surround interconnected end portions of the first pipe 10 and the second pipe 20 in circumferential directions thereof and serve to adjust close contact coupling forces to the outer peripheral surfaces of the first pipe 10 and the second pipe 20 through the adjustment members 310.

In this case, each adjustment member 310 is configured to have a screw thread coupling structure in such a way as to rotate by means of a driver or wrench, so that it serves to adjust the length of the band body 320 wound onto the tightening plate 200. In this case, the adjustment member 310 having a typical structure may be adopted.

As shown in FIG. 3, the band body 320 has a plurality of locking pieces 321 spaced apart from one another along a longitudinal direction thereof in such a way as to be lockedly inserted into the plurality of locking holes 210 formed on the tightening plate 200, so that the band body 320 is temporarily coupled to the tightening plate 200.

The plurality of pressurizing pins 330 are spaced apart from one another along the longitudinal direction of the band body 320, and when the adjustment member 310 rotates to allow the band body 320 to be brought into closer contact with the tightening plate 200 and thus pressurize the outer peripheral surface of the tightening plate 200 toward the corresponding pipe, that is, when the above-mentioned close contact coupling force increases, the plurality of pressurizing pins 330 serve to provide pressurizing forces to the corresponding pipe.

Figure 7:
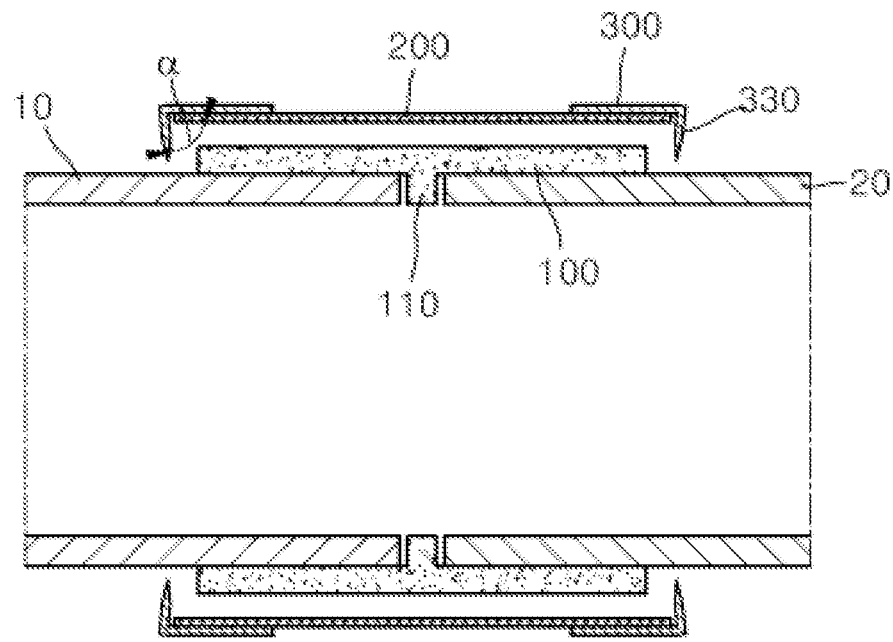
FIG. 7 is a sectional view showing sequential processes of allowing a pair of pipes to be tightly connected to each other using the pipe binding device according to the embodiment of the present invention.
Figure 7:
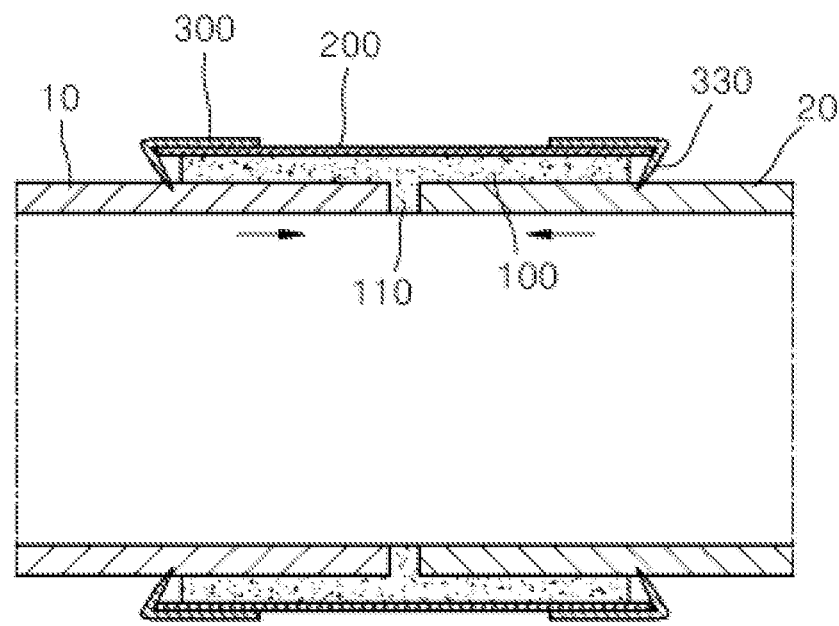

In detail, the plurality of pressurizing pins 330 have sharp end portions, and as shown in FIG. 7, when the band bodies 320 tighteningly pressurize the tightening plate 200, the plurality of pressurizing pins 330 provide the pressurizing forces to the corresponding pipes in such a way as to allow the first pipe 10 and the second pipe 20 to move in directions closer to each other.

Like this, as shown in FIG. 7, the first pipe 10 and the second pipe 20 move in the directions closer to each other, so that the end portion of the first pipe 10 more tightly comes into contact with one side periphery of the contact ring 110 of the rubber band 100 and the end portion of the second pipe 20 more tightly comes into contact with the other side periphery of the contact ring 110 of the rubber band 100. Through the close contacts of the end portions of the pipes, gaps between the contact ring 110 and the end portions of the first pipe 10 and the second pipe 20 do not occur, and accordingly, waste water (sewage) flowing along the first pipe and the second pipe is prevented from leaking through gaps between the inner peripheral surface of the rubber and 100 and the outer peripheral surfaces of the first pipe 10 and the second pipe 20.

Generally, if a small gap occurs, a fluid flows into the gap and is thus introduced around the gap, and according to the present invention, the gaps between the contact ring 110 and the end portions of the first pipe 10 and the second pipe 20 are basically prevented from occurring so that the fluid is prevented from leaking to the outside through the gaps between the inner peripheral surface of the rubber and 100 and the outer peripheral surfaces of the first pipe 10 and the second pipe 20.

Additionally, in a state where the rubber band 100 is coupled to the end portions of the first pipe 10 and the second pipe 20 by the worker, it is hard to check whether the end portions of the first pipe 10 and the second pipe 20 come into contact with the contact ring 110 with the naked eye. According to the present invention, however, the end portions of the first pipe 10 and the second pipe 20 are reliably brought into close contact with the contact ring 110 by means of the pressurizing forces of the pressurizing pins 330.

Hereinafter, the pressurizing pins 330 for pressurizing the first pipe and the second pipe to move the first pipe and the second pipe in the directions closer to each other will be explained in configuration and principle thereof.

According to the embodiment of the present invention, the plurality of pressurizing pins 330 are arranged only on one side transverse periphery of each band body 320.

Figure 6:
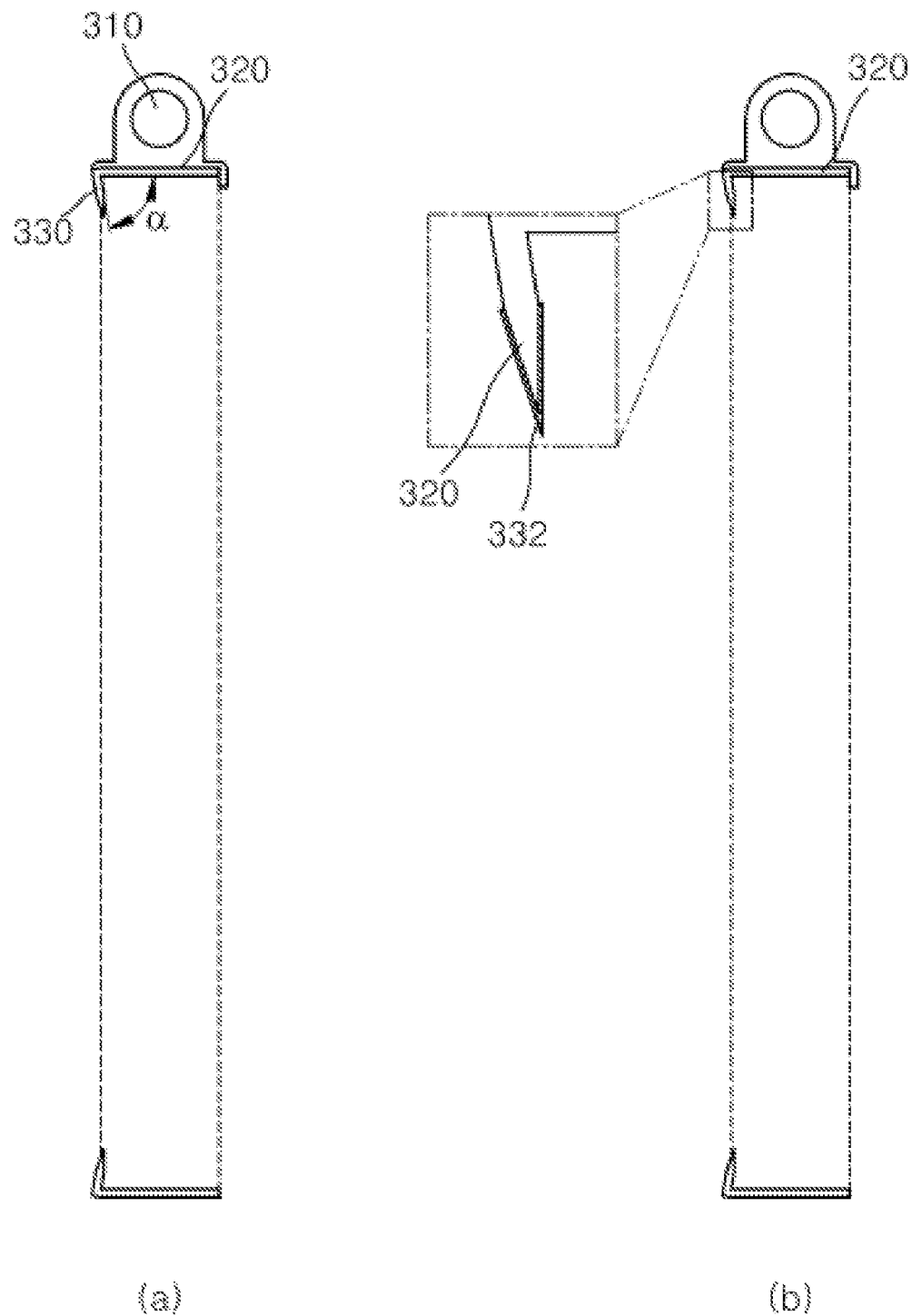
FIG. 6 is a sectional view showing pipe binding bands of the pipe binding device according to the embodiment of the present invention.

Further, as shown in FIGS. 3 and 6, if two pipe binding bands 300 are provided, the pressurizing pins 330 are arranged on the left end portion of the band body 320 of the left pipe binding band 300, and the pressurizing pins 330 are arranged on the right end portion of the band body 320 of the right pipe binding band 300. The pressurizing pins 330 are not arranged on the other side end portion of the band body 320 located on top of the tightening plate 200 in such a way as to be not exposed to the outside of the tightening plate 200.

In a state where the pipe binding bands 300 are coupled to the tightening plate 200, the plurality of pressurizing pins 330 are located on the outside from the tightening plate 200, and when the adjustment members 310 rotate, accordingly, the end portions of the pressurizing pins 330 are smoothly inserted into the outer peripheral surfaces of the first pipe 10 and the second pipe 20, without being blocked by the tightening plate 200.

According to the embodiment of the present invention, as shown in FIG. 6, the plurality of pressurizing pins 330 are slantly bent from the transverse end portion of the band body 320 in such a way as to form an angle α less than 90° with the band body 320.

Through the slantly bent pressurizing pins 330, while the adjustment members 310 are rotating to allow the band body 320 to be gradually brought into close contact with the tightening plate 200 so that the close contact pressurizing force of the band body 320 with the tightening plate 200 increases, as shown in FIGS. 5 and 7, the sharp bent end portions of the pressurizing pins 330 are inserted into the outer peripheral surfaces of the first pipe 10 and the second pipe 20 along their slant directions.

As the pressurizing pins 330 are inserted into the first pipe 10 and the second pipe 20 along their slant directions, they apply moving pressurizing forces to the first pipe 10 and the second pipe 20 so that the first pipe 10 and the second pipe 20 move in the directions closer to each other.

According to the present invention, the initial slant bending of the pressurizing pins 330 enables the slant end portions of the pressurizing pins 330 to be easily inserted into the pipes, and the slant insertion directions of the end portions of the pressurizing pins 330 allow the moving pressurizing forces to be more easily transferred to the first pipe 10 and the second pipe 20.

According to the embodiment of the present invention, the pressurizing pins 330 are made of the same metal as the band bodies 320, and desirably, the pressurizing pins 330 are made of a material having higher stiffness than the first pipe and the second pipe so that the bent end portions thereof are easily inserted into the outer peripheral surfaces of the first pipe 10 and the second pipe 20.

According to the embodiment of the present invention, the tightening plate 200 and the pipe binding bands 300 are fixedly coupled integrally to each other by means of welding, such as spot welding, and the like.

In this case, as mentioned above, while the pressurizing pins 330 are being fastened to the band bodies 320, the angle α between the pressurizing pins 330 and each band body 320 becomes reduced, and accordingly, the pressurizing pins 330 are inserted into the outer peripheral surfaces of the first pipe 10 and the second pipe 20.

Further, the tightening plate 200 and the band bodies 320 are temporarily coupled to each other by means of the locking holes 210 and the locking pieces 321, and in a state where the tightening plate 200 and the band bodies 320 do not move to the maximum through such temporary coupling, the welding is performed, thereby completing the welding smoothly and accurately.

According to the embodiment of the present invention, as shown in FIG. 6b, a reinforcing layer 332 is additionally formed on the bent end portion of each pressurizing pin 330, and the reinforcing layer 332 has higher stiffness than the pressurizing pin 330 as well as the first pipe 10 and the second pipe 20.

Through the above-mentioned fastening work, accordingly, the end portions of the pressurizing pins 330 are more smoothly inserted into the outer peripheral surfaces of the first pipe 10 and the second pipe 20. The reinforcing layers 332 are made by bending metal plates and bonding the metal plates to the end portions of the pressurizing pins 330 by means of welding. Otherwise, the reinforcing layers 332 are made by spraying reinforcing liquids onto the end portions of the pressurizing pins 330.

According to the present invention, a configuration where the end portions of the pressurizing pins 330 are inserted into the outer peripheral surfaces of the first pipe 10 and the second pipe 20 to allow the pressurizing pins 330 to be coupled integrally to the first pipe and the second pipe is adopted so that the pipe binding bands 300, the first pipe 10, and the second pipe 20 are kept to the integrally coupled state thereamong, and accordingly, when an external force is applied to the pipes or waste water/sewage flows at a high pressure, the pipes are prevented from being pushed and separated by the flow pressure, while excellent seismic performance is being achieved.

That is, the pipe located at the rear side with respect to the flowing direction of the waste water/sewage is prevented from being separated from the corresponding pipe binding band 300.

According to the present invention, further, the connected end portions of the first pipe and the second pipe are not fixed to each other by means of bonding, and if it is necessary to repair/exchange the first pipe 10 and the second pipe 20, accordingly, the pipe binding bands 300 coupled to the pipes 20 are released from their coupled state and separated from the pipes. Next, the first pipe and/or the second pipe are exchanged with new ones with ease, and they are fastened to the pipe binding bands 300 again, so that the repair and exchange works are more easily done.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The present invention is configured to allow the pipe binding device to be fixed integrally to the pair of pipes when the pair of pipes is connected to each other, so that when an external force is applied to the pipes or the pipes are clogged to thus perform high-pressure unclogging, the pipes are prevented from being pushed and separated from the pipe binding device by the flow pressure of high-pressure water, and further, water leakage is prevented.

The invention claimed is:

1. A pipe binding device configured to connect a first pipe and a second pipe made of a synthetic resin to each other, the pipe binding device comprising:
   at least two pipe binding bands, each including:
   a band body having a ring shape to surround an interconnected end portion of the first pipe or the second pipe in a circumferential direction thereof, the band body being configured to adjust a close contact coupling force to an outer peripheral surface of the first pipe or the second pipe by using an adjustment member mounted on the band body, and
   a plurality of pressurizing pins spaced apart from one another along a longitudinal direction of the band body, the plurality of pressurizing pins being configured to provide pressurizing forces to the first pipe or the second pipe so that the first pipe and the second pipe move in directions closer to each other,
   wherein the plurality of pressurizing pins are disposed in a transverse direction on one side periphery of the band body to allow a portion of an end of each of the plurality of pressurizing pins to be inserted into the first pipe or the second pipe to provide the pressurizing forces to the first pipe or the second pipe, as the close contact coupling force of the band body with the first pipe or the second pipe increases; and
   a tightening plate having a metal material having a predetermined elasticity, the tightening plate being configured to surround the interconnected end portions of the first pipe and the second pipe in a circumferential direction thereof to allow a side end portion of the tightening plate to be stacked on top of another side end portion,
   wherein the at least two pipe binding bands are integrally fixed to the tightening plate, and each of the at least two pipe binding bands is spaced apart from another, and
   wherein the at least two pipe binding bands are integrally fixed to the tightening plate by welding.

* * * * *